(12) United States Patent
Theratil et al.

(10) Patent No.: US 10,823,196 B2
(45) Date of Patent: Nov. 3, 2020

(54) COMPRESSOR DIFFUSER WITH DIFFUSER PIPES VARYING IN NATURAL VIBRATION FREQUENCIES

(71) Applicant: PRATT & WHITNEY CANADA CORP., Longueuil (CA)

(72) Inventors: Ignatius Theratil, Mississauga (CA); Krishna Prasad Balike, Brampton (CA); Aldo Abate, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 202 days.

(21) Appl. No.: 16/100,473

(22) Filed: Aug. 10, 2018

(65) Prior Publication Data
US 2020/0049161 A1 Feb. 13, 2020

(51) Int. Cl.
*F04D 29/44* (2006.01)
*F02C 3/08* (2006.01)
*F04D 17/10* (2006.01)
*F04D 29/66* (2006.01)
(Continued)

(52) U.S. Cl.
CPC ............ *F04D 29/441* (2013.01); *F01N 1/06* (2013.01); *F02C 3/08* (2013.01); *F04D 17/10* (2013.01); *F04D 29/545* (2013.01); *F04D 29/661* (2013.01); *F04D 29/668* (2013.01); *F05D 2220/32* (2013.01); *F05D 2240/12* (2013.01); *F05D 2250/70* (2013.01); *F05D 2250/73* (2013.01); *F05D 2260/96* (2013.01)

(58) Field of Classification Search
CPC .... F02C 3/08; F02C 7/24; F23R 3/002; F23R 3/04; F04D 29/44441; F04D 29/661; F04D 29/668; F04D 29/681; F04D 29/545; F04D 29/547; F04D 29/44; F04D 29/441; F04D 17/10; F01D 9/02; F01D 9/045; F01N 1/06; F05D 2240/12; F05D 2240/128; F05D 2250/52; F05D 2250/70; F05D 2250/73; F05D 2260/96
See application file for complete search history.

(56) References Cited

U.S. PATENT DOCUMENTS

| | | |
|---|---|---|
| 2,157,002 A | 5/1939 | Moss |
| 3,706,510 A | 12/1972 | O'Connor |

(Continued)

FOREIGN PATENT DOCUMENTS

GB  2424927  10/2006

OTHER PUBLICATIONS

European Search Report issued for Application No. 19189674.5 dated Dec. 18, 2019.

*Primary Examiner* — Alain Chau
(74) *Attorney, Agent, or Firm* — Norton Rose Fulbright Canada LLP

(57) ABSTRACT

The diffuser pipe assembly for a compressor of a gas turbine engine includes diffuser pipes circumferentially distributed around a central axis and configured for distributing a flow of compressed air from the compressor to the combustor. Each of the diffuser pipes curving between an inlet end and an outlet end. A first subset of the diffuser pipes has a natural vibration frequency different than a natural vibration frequency of at least a second subset of the diffuser pipes. A method of operating a compressor including the diffuser pipe assembly is also disclosed.

17 Claims, 5 Drawing Sheets

(51) Int. Cl.
*F04D 29/54* (2006.01)
*F01N 1/06* (2006.01)

(56) References Cited

U.S. PATENT DOCUMENTS

| | | | | |
|---|---|---|---|---|
| 4,504,188 | A * | 3/1985 | Traver | F04D 29/441 415/1 |
| 6,123,506 | A * | 9/2000 | Brand | F04D 29/441 415/208.3 |
| 6,280,139 | B1 * | 8/2001 | Romani | F04D 29/441 415/207 |
| 6,379,112 | B1 * | 4/2002 | Montgomery | F01D 5/145 415/119 |
| 6,589,015 | B1 * | 7/2003 | Roberts | F04D 29/441 415/208.3 |
| 7,845,900 | B2 * | 12/2010 | Roduner | F04D 29/444 415/127 |
| 8,425,188 | B2 * | 4/2013 | Dovbush | F04D 29/441 415/208.3 |
| 9,234,526 | B2 * | 1/2016 | Zheng | F04D 29/685 |
| 9,709,062 | B2 * | 7/2017 | Zheng | F04D 17/10 |
| 9,848,745 | B2 * | 12/2017 | Hill | A47L 9/0081 |
| 9,874,223 | B2 | 1/2018 | Theratil et al. | |
| 9,926,942 | B2 * | 3/2018 | Duong | F02C 3/08 |
| 10,273,973 | B2 * | 4/2019 | Zheng | F04D 17/10 |
| 10,302,100 | B2 * | 5/2019 | Xu | F01D 5/143 |
| 10,465,708 | B2 * | 11/2019 | Clemen | F04D 29/322 |
| 10,570,925 | B2 * | 2/2020 | Duong | F04D 29/441 |
| 2010/0104432 | A1 * | 4/2010 | Hasselqvist | F01D 5/143 415/191 |
| 2010/0150709 | A1 | 6/2010 | Roduner et al. | |
| 2011/0271654 | A1 * | 11/2011 | Siden | F04D 29/545 60/39.37 |
| 2011/0274537 | A1 * | 11/2011 | Duong | F04D 29/666 415/182.1 |
| 2013/0000308 | A1 | 1/2013 | Dovbush et al. | |
| 2014/0369814 | A1 | 12/2014 | Theratil et al. | |
| 2016/0017796 | A1 * | 1/2016 | Xu | F01D 5/143 415/208.2 |
| 2016/0053684 | A1 | 2/2016 | Labrecque et al. | |
| 2016/0091206 | A1 | 3/2016 | Rathmann et al. | |
| 2016/0115971 | A1 * | 4/2016 | Duong | F01D 9/045 60/751 |
| 2017/0023014 | A1 * | 1/2017 | Clemen | F01D 9/02 |
| 2017/0108003 | A1 * | 4/2017 | Rusch | F04D 17/10 |
| 2017/0114794 | A1 * | 4/2017 | Duong | F02C 3/08 |
| 2017/0114797 | A1 * | 4/2017 | Duong | F02C 3/08 |
| 2017/0175776 | A1 | 6/2017 | Theratil et al. | |

* cited by examiner

COMPRESSOR DIFFUSER WITH DIFFUSER PIPES VARYING IN NATURAL VIBRATION FREQUENCIES

TECHNICAL FIELD

The application relates generally to gas turbine engine and, more particularly, to diffuser pipe assemblies of centrifugal compressors used in such engines.

BACKGROUND

Centrifugal compressors of gas turbine engines which employ diffuser pipes downstream of an impeller are known to be exposed to high stresses. Consequently, past attempts have been made to account for such stresses by designing the diffuser pipes in a manner that will make them stiffer and thus less likely to be affected by such stresses.

SUMMARY

In one aspect, there is provided a diffuser pipe assembly for a centrifugal compressor of a gas turbine engine defining a central axis extending longitudinally through the diffuser pipe assembly, the diffuser pipe assembly comprising: a plurality of diffuser pipes circumferentially distributed around the central axis and configured for diffusing a flow of compressed air received from an impeller, the diffuser pipes curving between an inlet end and an outlet end, and a first subset of the diffuser pipes configured to have a natural vibration frequency different than a natural vibration frequency of at least a second subset of the diffuser pipes.

In another aspect, there is provided a gas turbine engine comprising a centrifugal compressor rotatable about a central axis and a combustor downstream of the centrifugal compressor relative to a flow of compressed air exiting the centrifugal compressor, the centrifugal compressor including an impeller and a diffuser pipe assembly downstream of the impeller, the diffuser pipe assembly configured for redirecting the flow of compressed air from a radial direction to an axial direction relative to the central axis, the diffuser pipe assembly including diffuser pipes circumferentially distributed around the central axis, the diffuser pipes defining diffuser conduits fluidly connected to the impeller and to the combustor, and a first subset of the diffuser pipes configured to have a natural vibration frequency different than a natural vibration frequency of at least a second subset of the diffuser pipes.

In yet another aspect, there is provided a method of operating a centrifugal compressor of a gas turbine engine, the centrifugal compressor having an impeller and a diffuser pipe assembly downstream thereof, the method comprising: separating a flow of air exiting the impeller in sub-flows of air, and feeding the sub-flows of air to diffuser pipes of the diffuser pipe assembly and directing the fed sub-flows through the diffuser pipes toward the combustor; and limiting a transfer of vibrations from at least one of the diffuser pipes to adjacent diffuser pipes by providing the at least one of the diffuser pipes with a natural vibration frequency that is different from that the adjacent diffuser pipes to generate a natural vibration frequency offset between the at least one of the diffuser pipes and the adjacent diffuser pipes.

BRIEF DESCRIPTION OF THE DRAWINGS

Reference is now made to the accompanying figures in which.

DETAILED DESCRIPTION

Figure 1:
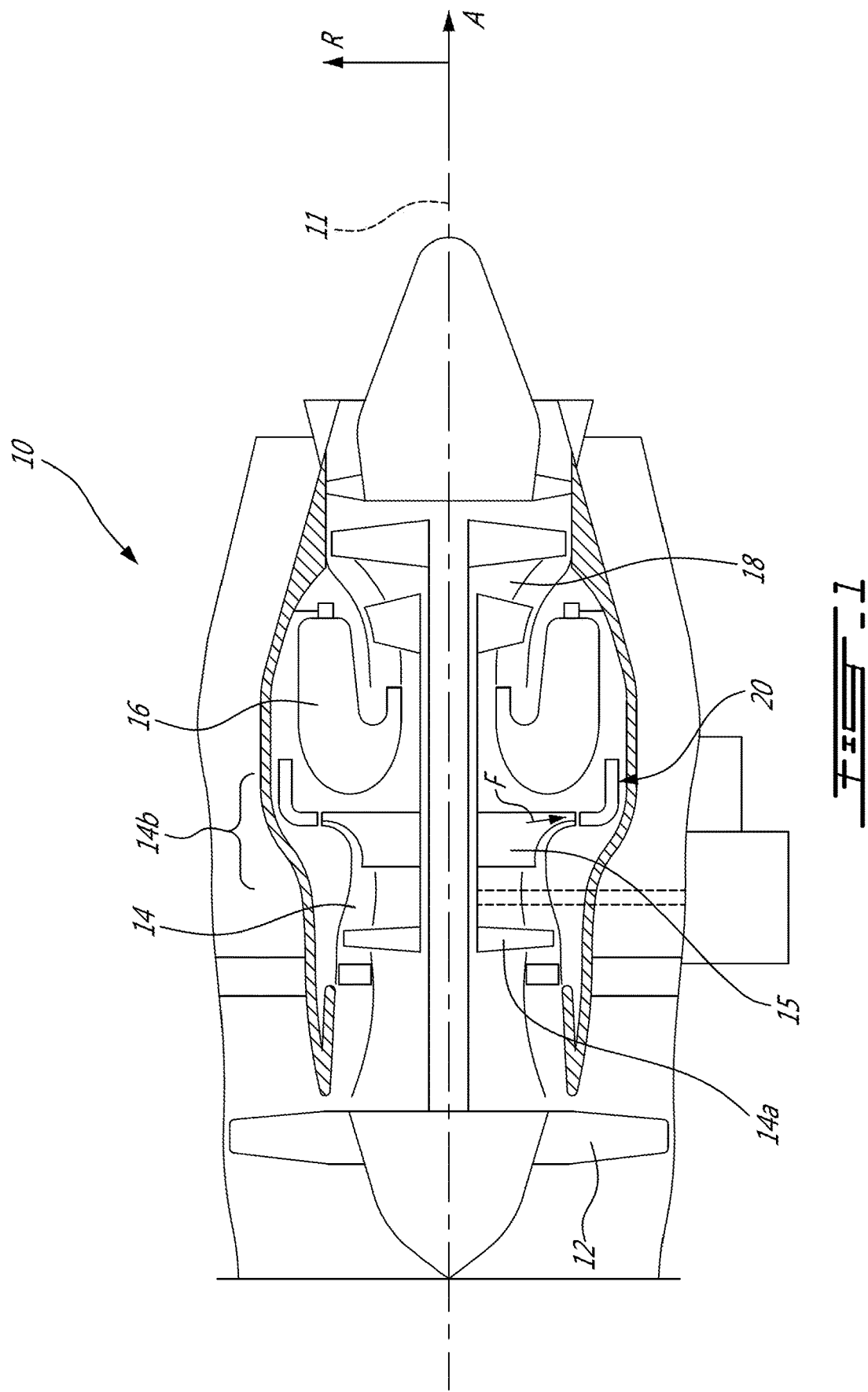
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine. The central axis 11 extends through the combustor 16 such that the combustor 16 circumferentially extends around the central axis 11.

Still referring to FIG. 1, the compressor section 14 includes a low pressure compressor 14a and a high pressure compressor 14b. The low pressure compressor 14a may be an axial compressor that includes a plurality of compressor stages each including a rotor and a stator. The high pressure compressor 14b is a centrifugal, or radial, compressor including an impeller 15 and a diffuser pipe assembly 20. The impeller 15 receives air that has been compressed by the low pressure compressor 14a along an axial direction A relative to the central axis 11. The impeller 15 includes a plurality of blades defining passages between two adjacent ones of the blades. The passages have each an inlet that is oriented substantially along the axial direction A and an outlet that is oriented substantially along a radial direction R relative to the central axis 11. The air from the low pressure compressor 14a, further to see its pressure increase via its circulation in the passages of the impeller 15, changes direction for being substantially axial to being substantially radial.

Figure 2:
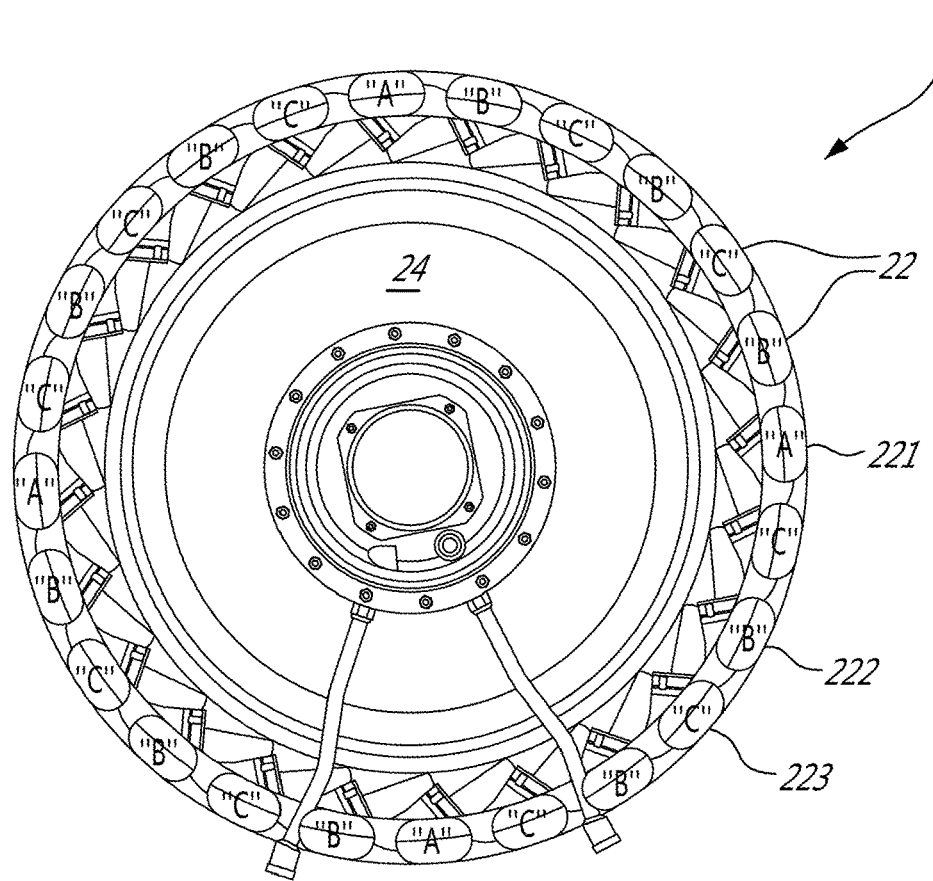
FIG. 2 is a front elevation view of a diffuser pipe assembly of the gas turbine of FIG. 1 in accordance with one embodiment.

Referring now to FIG. 2, the diffuser pipe assembly 20 of the centrifugal compressor 14b is used for redirecting the flow of compressed air that exits the impeller 15 of the high pressure compressor 14b from being substantially radial to being substantially axial relative to the central axis 11. The diffuser pipe assembly 20 includes diffuser pipes 22 and a diffuser case 24 on which the diffuser pipes 22 are secured. Each of the diffuser pipes 22 receives a portions of the flow, or a respective one of sub-flows, of compressed air from the impeller 15 and redirects it toward the combustor 16.

It has been observed that when a diffuser pipe 22 defined has a primary pipe vibrates at its natural vibration frequency due to excitation generated by the circulation of the compressed air in the diffuser pipe 22, it transfers vibrations to an adjacent diffuser pipe 22 through an air medium between the diffuser pipes 22 as well as through the diffuser case 24 to which the diffuser pipes 22 are secured. If the adjacent diffuser pipe 22 has a natural vibration frequency corresponding to that of the primary diffuser pipe 22, the adjacent diffuser pipe participates in the vibration of the primary pipe. When both the adjacent and primary diffuser pipes 22 vibrate at the same frequency, there is additional amplification of vibrations through the air medium and through the diffuser case 24 that is common to both the diffuser pipes 22 due to sympathetic vibrations.

To attenuate at least partially the above mentioned phenomenon, it might be advantageous to use different types of diffuser pipes 22 for a same diffuser pipe assembly 20 to mistune the natural vibration frequencies such that a natural vibration frequency of at least one of the diffuser pipes 22 is different from that of a remainder of the diffuser pipes 22 of the diffuser pipe assembly 20. This might avoid propagating and amplifying vibrations of the primary diffuser pipe 22.

In the embodiment shown in FIG. 2, the diffuser pipes 22 of the diffuser pipe assembly 20 are divided into a first (A), a second (B), and a third (C) subset of diffuser pipes 221, 222, 223. The diffuser pipes 221 of the first subset have each a first natural vibration frequency. The diffuser pipes 222 of the second subset have each a second natural vibration frequency different than the first natural vibration frequency. And, the diffuser pipes of the third subset 223 have each a third natural vibration frequency different than both of the first natural vibration frequency and the second natural vibration frequency. In a particular embodiment, a relative difference between the first, second, and third natural vibration frequencies is from 1% to 10%. In a particular embodiment, each of the subsets includes more than one of the diffuser pipes. In the embodiment shown, the diffuser pipes are divided between the first, the second, and the third subsets.

More specifically, the diffuser pipes 221 of the first subset have each a first set of natural vibration frequencies. The diffuser pipes 222 of the second subset have each a second set of natural vibration frequencies. And, the diffuser pipes of the third subset 223 have each a third set of natural vibration frequencies. Each of the first, second, and third sets of natural vibration frequencies includes one frequency that is closest to a vibration frequency of the gas turbine engine. These frequencies corresponds to the above mentioned first, second, and third natural vibration frequencies. At least the first, second, and third natural vibration frequencies are different from one another. In a particular embodiment, more than one or all frequencies of the first, second, and third sets of natural vibration frequencies are different from one another.

In the depicted embodiment, the diffuser pipes of the first, second, and third subsets 221, 222, 223 are disposed in a random manner around the central axis 11. Other configurations are contemplated without departing from the scope of the present disclosure. For instance, in a particular embodiment, the diffuser pipes of the first, second, and third subsets 221, 222, 223 may be disposed in alternation around the central axis 11 (A-B-C-A-B-C . . . ).

Figure 3:
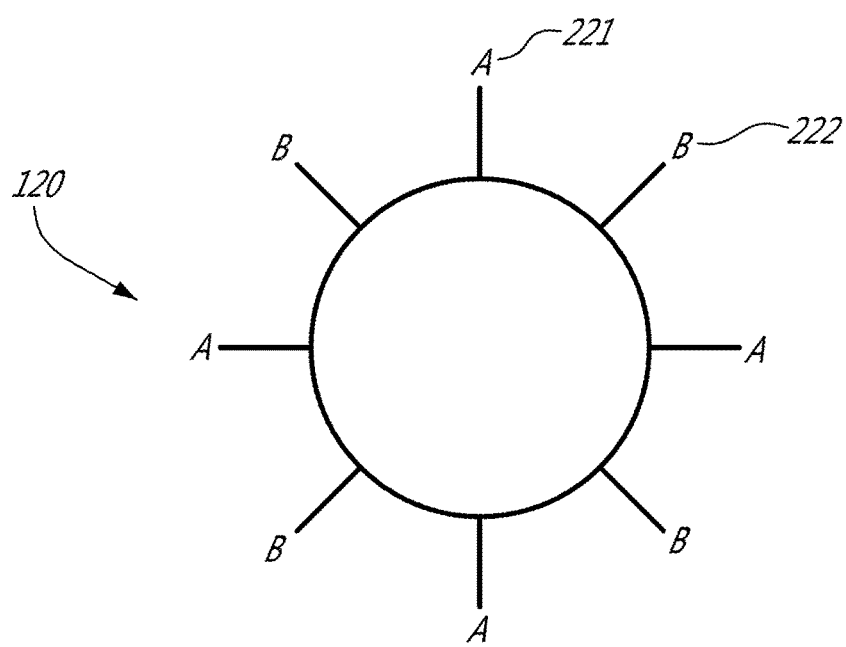
FIG. 3 is a schematic front elevation view of a diffuser pipe assembly of the gas turbine of FIG. 1 in accordance with another embodiment.

Referring now to FIG. 3, a diffuser pipe assembly in accordance with another embodiment is generally shown at 120. As illustrated, the diffuser pipes 22 may be divided into a first (A) and a second (B) subsets of diffuser pipes 22. The diffuser pipes of the first subset 221 have each a first natural vibration frequency and the diffuser pipes of the second subset 222 have each a second natural vibration frequency different than the first natural vibration frequency. In the embodiment shown, the diffuser pipes are divided between the first and the second subsets. In a particular embodiment, a relative difference between the first and second natural vibration frequencies is from 1% to 10%.

More specifically, the diffuser pipes of the first subset 221 have each a first set of natural vibration frequencies and the diffuser pipes of the second subset 222 have each a second set of natural vibration frequencies. Similarly to the embodiment of FIG. 3, each of the first and second sets of natural vibration frequencies includes one frequency that is closest to a vibration frequency of the gas turbine engine. These frequencies corresponds to the above mentioned first and second natural vibration frequencies. At least the first and second natural vibration frequencies are different from one another. In a particular embodiment, more than one or all frequencies of the first and second sets of natural vibration frequencies are different from one another.

In the depicted embodiment, the diffuser pipes of the first and second subsets 221, 222 are disposed in alternation around the central axis (i.e., A-B-A-B . . . ). Other configurations are contemplated without departing from the scope of the present disclosure. For instance, more than three subsets of diffuser pipes may be used without departing from the scope of the present disclosure. It is understood that a subset may include only one diffuser pipe. In a particular embodiment, the diffuser pipes includes a first subset and at least a second subset of diffuser pipes; the first subsect having a natural vibration frequency different than a natural vibration frequency of the at least second subset of diffuser pipes.

In a particular embodiment, all of the diffuser pipes 22 of the diffuser pipe assembly 20 may have a single, common shape and at least one of the diffuser pipes 22 may be made of a material different than that of a remainder of the diffuser pipes 22 such that the natural vibration frequency of the at least one of the diffuser pipes 22 is different than that of the remainder of the diffuser pipes 22. The variation in the natural vibration frequencies may result from a difference between the Young's moduli, or stiffness, of the diffuser pipes 22.

Figure 4:
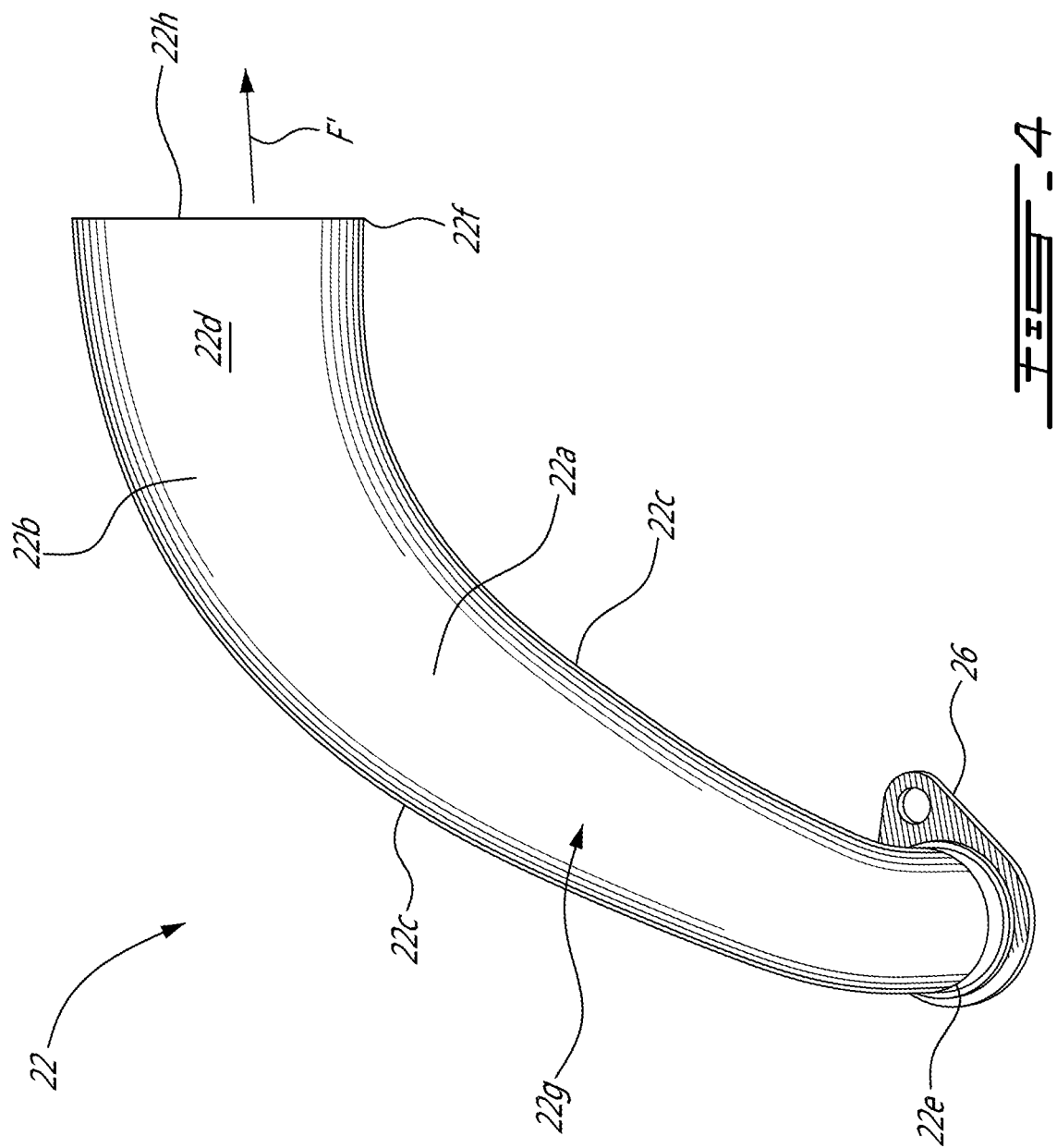
FIG. 4 is a three-dimensional view of a diffuser pipe of the diffuser pipe assembly in accordance with one embodiment.

Referring more particularly to FIG. 4, each of the diffuser pipes 22 includes a hollow pipe body 22a that may be made of two formed metal sheets that might be welded to each other or secured to each other via any suitable process. It is contemplated that the diffuser pipes 22 could be stamped, hydroformed, cast, 3D printed, or machined. In a particular embodiment, the metal sheets have a thickness of 0.035 inch. The hollow pipe body 22a defines two flat faces 22b each located on a respective opposed sides of the hollow pipe body 22a. The two flat faces 22b are connected together via opposed curved faces 22c.

The hollow pipe body 22a defines a diffuser conduit 22d that extends between an inlet end 22e and an outlet end 22f. The hollow pipe body 22a has a curvature 22g between the inlet end 22e and the outlet end 22f. In the embodiment shown, the inlet end 22e is welded to a ferrule 26, which connects the diffuser pipe 22 to the diffuser case 24 by bolting. It is contemplated that the diffuser pipe 22 could be connected to the diffuser case 24 by brazing as well. The outlet end 22f defines an edge 22h that might be secured to a ring as discussed herein below.

Figure 5:
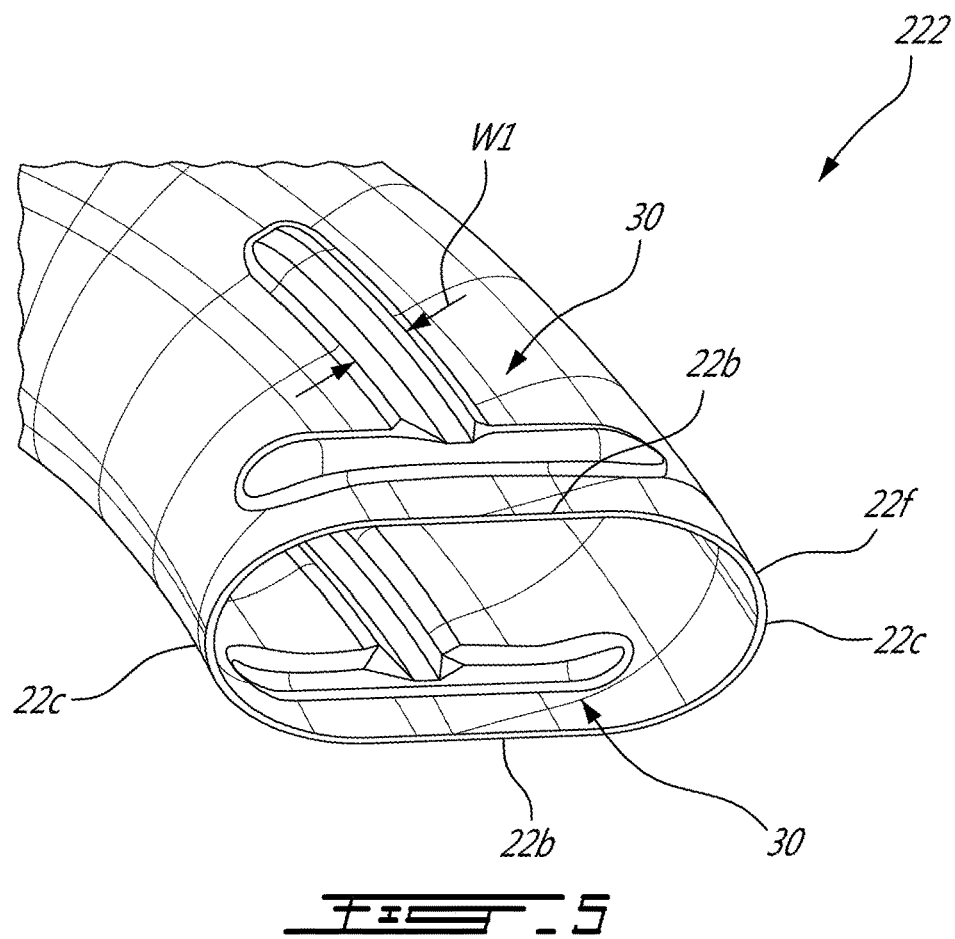
FIG. 5 is a three-dimensional view of a portion of a diffuser pipe in accordance with a particular embodiment.

Referring now to FIG. 5, a possible embodiment of a diffuser pipe is shown at 222. The diffuser pipe 222 is similar to the diffuser pipe 22 shown in FIG. 4, but includes at least one dimple 30 located proximate the outlet end 22f. In the embodiment shown, the diffuser pipe 222 includes two dimples 30 each located on a respective one of the flat faces 22b of the hollow pipe body 22a. The dimples 30 are used to vary a stiffness of the diffuser pipe 222 relative of a diffuser pipe lacking such dimples 30. In the embodiment shown, the dimples 30 have a T-shape. A width W1 of the dimples may be of from 0.01 inch to 0.5 inch.

FIGS. 6 to 12 show other shapes of dimples to be used with the diffuser pipes of the diffuser pipe assembly.

Figure 6:
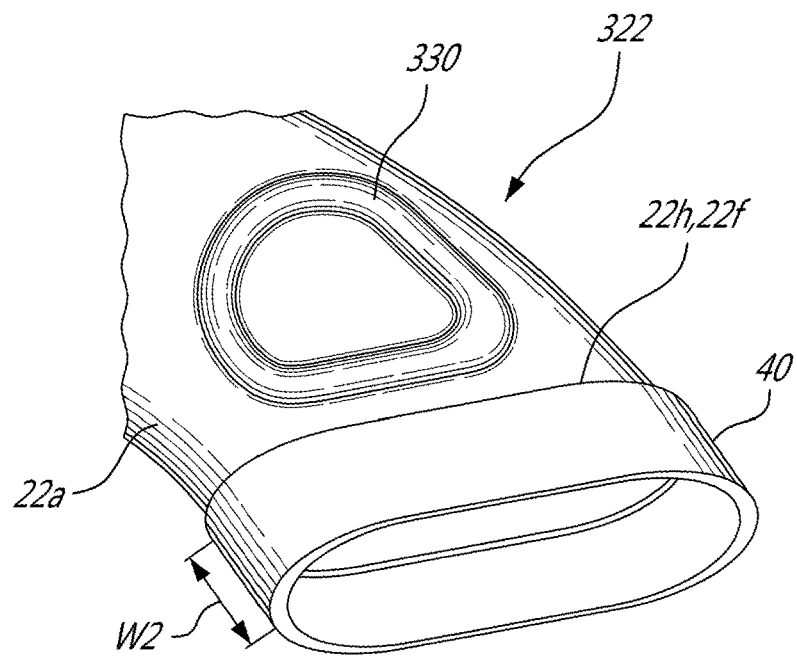
FIGS. 6 to 12 are schematics views of different shapes of dimples for a diffuser pipe of the diffuser pipe assembly in accordance with particular embodiments.

The diffuser pipe 322 of FIG. 6 has a dimple 330 having D-shape. In the embodiment shown, the diffuser pipe 322 includes a ring 40 secured to the edge 22h of the hollow pipe body 22a and at the outlet end 22f of the hollow pipe body 22a. The ring 40 circumferentially extends along a perimeter of the outlet end 22f. In particular embodiment, the natural vibration frequency of at least one of the diffuser pipes 322 may be varied by changing a stiffness of the ring 40 of the at least one of the diffuser pipes 22. The stiffness may be varied by using a material different than that of the rings 40 of the other diffuser pipes and/or by having a thickness of the ring 40 of the at least one of the diffuser pipes 322 different than that of the rings 40 of the other diffuser pipes 322 and/or by having a width W2 of the ring 40 of the at least one of the diffuser pipes 322 different than that of the other diffuser pipes 322.

Figure 9:
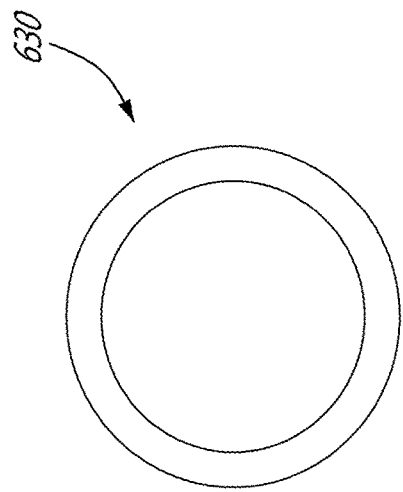
Figure 12:
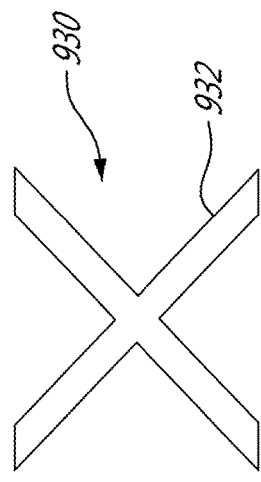
Figure 8:
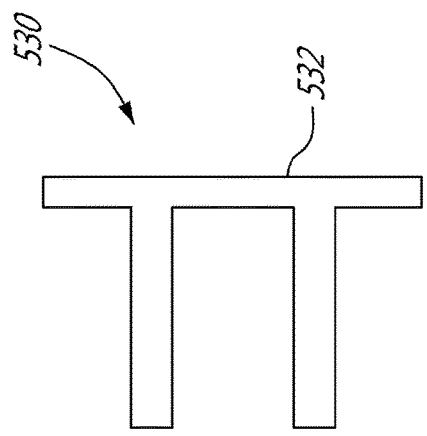
Figure 11:
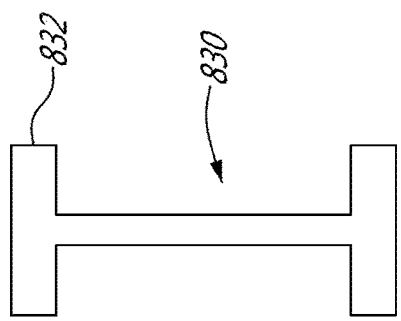
Figure 7:
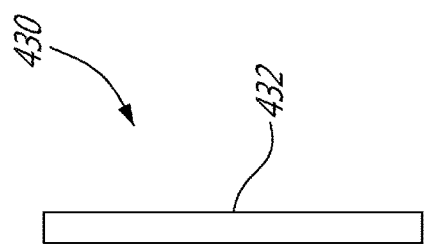
Figure 10:
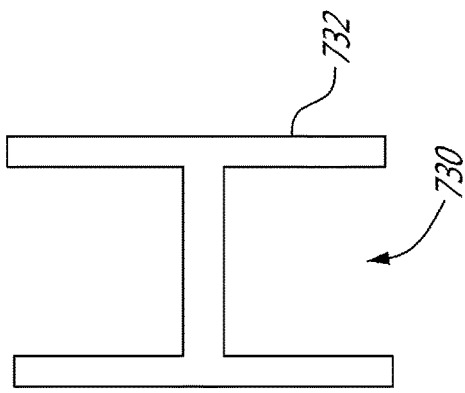

The dimple 430 of FIG. 7 is a straight line 432 and might be disposed parallel to the edge 22h. The dimple 530 of FIG. 8 is Pi-shaped and has a straight portion 532 that might be disposed parallel to the edge 22h. The dimple 630 of FIG. 9 is O-shaped. The dimple 730 of is FIG. 10 is H-shaped and has a straight portion 732 that might be disposed parallel to the edge 22h. The dimple 830 of FIG. 11 is I-shaped and has a straight portion 832 that might be disposed parallel to the edge 22h. The dimple 930 of FIG. 12 is X-shaped. The X-shape dimple might be oriented to have a top of one of the V 932 forming the X parallel to the edge 22h. All the dimples shown on FIGS. 7 to 13 are schematics. Diffuser pipes 22 of the diffuser pipe assembly 20 may be provided with any combinations of the disclosed dimples.

For operating the centrifugal compressor 14b of the gas turbine engine 10 the flow F (FIG. 1) of compressed air exiting the impeller 15 is separated in sub-flows F' (FIG. 4) of compressed air. The sub-flows F' are fed to the diffuser pipes 22 of the diffuser pipe assembly 20 and directed toward the combustor 16. A transfer of vibrations from at least one of the diffuser pipes 221 to adjacent diffuser pipes 222, 223 is limited by providing the at least one of the diffuser pipes 221 with a natural vibration frequency that is different from that the adjacent diffuser pipes 222, 223 to generate a natural vibration frequency offset between the at least one of the diffuser pipes 221 and the adjacent diffuser pipes 222, 223.

In a particular embodiment, altering the natural frequencies of the at least one of the diffuser pipes 221 relative to the other diffuser pipes 222, 223 allows to limit the transfer of resonance to the adjacent pipes 222, 223 and allows to limit amplification of the vibrations.

In a particular embodiment, the mistuning of the diffuser pipes is achieved by having the diffuser pipes differing by their geometries, by their thicknesses of sheet metals from which they are manufactured, by materials from which they are manufactured, and/or by variations in dimples defined on them. Stiffeners may also be used; the mistuning being achieved by having at least one diffuser pipe having a stiffener different than that of the others. Alternatively, only one of the diffuser pipes has a stiffener and/or a dimple.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A diffuser pipe assembly for a centrifugal compressor of a gas turbine engine defining a central axis extending longitudinally through the diffuser pipe assembly, the diffuser pipe assembly comprising: a plurality of diffuser pipes circumferentially distributed around the central axis and configured for diffusing a flow of compressed air received from an impeller, the diffuser pipes curving between an inlet end and an outlet end, and a first subset of the diffuser pipes made of a first material and configured to have a natural vibration frequency different than a natural vibration frequency of at least a second subset of the diffuser pipes made of at least a second material different than the first material.

2. The diffuser pipe assembly of claim 1, wherein the first subset of diffuser pipes includes more than one of the diffuser pipes and the second subset of diffuser pipes includes a remainder of the diffuser pipes, the diffuser pipes of the first subset having each a first natural vibration frequency, the diffuser pipes of the second subset having each a second natural vibration frequency different than the first natural vibration frequency.

3. The diffuser pipe assembly of claim 2, wherein the diffuser pipes of the first subset and of the second subset circumferentially alternate around the central axis.

4. The diffuser pipe assembly of claim 1, wherein the diffuser pipes are divided between the first, the second, and a third subset of diffuser pipes, the diffuser pipes of the first subset having each a first natural vibration frequency, the diffuser pipes of the second subset having each a second natural vibration frequency different than the first natural vibration frequency, and the diffuser pipes of the third subset having each a third natural vibration frequency different than both of the first natural vibration frequency and the second natural vibration frequency.

5. The diffuser pipe assembly of claim 4, wherein diffuser pipes of the first subset, of the second subset, and of the third subset are circumferentially disposed randomly around the central axis.

6. The diffuser pipe assembly of claim 1, wherein the first subset of the diffuser pipes has a cross-sectional shape different than that of the second subset of the diffuser pipes.

7. The diffuser pipe assembly of claim 1, wherein a hollow pipe body of the first subset of the diffuser pipes has a dimple located thereon, the dimple having a shape that is different than a shape of dimples located on hollow pipe bodies of the second subset of the diffuser pipes.

8. The diffuser pipe assembly of claim 7, wherein the dimple is located proximate the outlet end.

9. The diffuser pipe assembly of claim 1, wherein the first subset of the diffuser pipes has a stiffness different than that of the second subset of the diffuser pipes.

10. A gas turbine engine comprising a centrifugal compressor rotatable about a central axis and a combustor downstream of the centrifugal compressor relative to a flow of compressed air exiting the centrifugal compressor, the centrifugal compressor including an impeller and a diffuser pipe assembly downstream of the impeller, the diffuser pipe assembly configured for redirecting the flow of compressed air from a radial direction to an axial direction relative to the central axis, the diffuser pipe assembly including diffuser pipes circumferentially distributed around the central axis, the diffuser pipes defining diffuser conduits fluidly connected to the impeller and to the combustor, and a first subset of the diffuser pipes configured to have a natural vibration frequency different than a natural vibration frequency of at least a second subset of the diffuser pipes, a hollow pipe body of the first subset of the diffuser pipes has a dimple located thereon, the dimple having a shape different than a shape of dimples located on hollow pipe bodies of the second subset of the diffuser pipes, the dimple located proximate an outlet end.

11. The gas turbine engine of claim 10, wherein the first subset of diffuser pipes includes more than one of the diffuser pipes and the second subset of diffuser pipes includes a remainder of the diffuser pipes, the diffuser pipes of the first subset having each a first natural vibration frequency, the diffuser pipes of the second subset having each a second natural vibration frequency different than the first natural vibration frequency.

12. The gas turbine engine of claim 11, wherein the diffuser pipes of the first subset and of the second subsets are disposed in alternation around the central axis.

13. The gas turbine engine of claim 10, wherein the diffuser pipes are divided between the first, the second, and the third subset of diffuser pipes, the diffuser pipes of the first subset having each a first natural vibration frequency, the diffuser pipes of the second subset having each a second natural vibration frequency different than the first natural vibration frequency, and the diffuser pipes of the third subset having each a third natural vibration frequency different than both of the first natural vibration frequency and the second natural vibration frequency.

14. The gas turbine engine of claim 13, wherein diffuser pipes of the first subset, of the second subset, and of the third subset are disposed randomly around the central axis.

15. The gas turbine engine of claim 10, wherein the first subset of the diffuser pipes is made of a material different than that of the second subset of the diffuser pipes.

16. The gas turbine engine of claim 10, wherein the first subset of the diffuser pipes has a shape different than that of the second subset of the diffuser pipes.

17. A method of operating a centrifugal compressor of a gas turbine engine, the centrifugal compressor having an impeller and a diffuser pipe assembly downstream thereof, the method comprising:

separating a flow of air exiting the impeller into sub-flows of air, and feeding the sub-flows of air to diffuser pipes of the diffuser pipe assembly and directing the fed sub-flows through the diffuser pipes toward the combustor; and limiting a transfer of vibrations from at least one of the diffuser pipes to adjacent diffuser pipes by providing the at least one of the diffuser pipes with a natural vibration frequency that is different from that the adjacent diffuser pipes to generate a natural vibration frequency offset between the at least one of the diffuser pipes and the adjacent diffuser pipes, the at least one of the diffuser pipes made of a material different than that of the adjacent diffuser pipes.

* * * * *